(12) United States Patent
McMillan

(10) Patent No.: US 8,267,054 B2
(45) Date of Patent: Sep. 18, 2012

(54) ENGINE FLUID COOLER

(76) Inventor: George Erik McMillan, Hickory, NC (US)

( * ) Notice: Subject to any disclaimer, the term of this patent is extended or adjusted under 35 U.S.C. 154(b) by 827 days.

(21) Appl. No.: 12/328,118

(22) Filed: Dec. 4, 2008

(65) Prior Publication Data

US 2009/0139473 A1 Jun. 4, 2009

Related U.S. Application Data

(60) Provisional application No. 60/992,240, filed on Dec. 4, 2007.

(51) Int. Cl.
 *F01P 7/10* (2006.01)
(52) U.S. Cl. .................................. 123/41.49; 123/41.33
(58) Field of Classification Search ............... 123/41.31, 123/41.32, 41.33, 41.34, 196 A, 196 B; 184/104.1, 184/104.2, 104.3
See application file for complete search history.

(56) References Cited

U.S. PATENT DOCUMENTS

| | | | | |
|---|---|---|---|---|
| 3,599,612 A | * | 8/1971 | Villella ........................ 123/44 D |
| 3,854,459 A | * | 12/1974 | Stimeling ........................ 165/98 |
| 3,977,195 A | * | 8/1976 | Treuil .............................. 60/599 |
| 4,019,324 A | * | 4/1977 | Coxon ............................. 60/624 |
| 4,083,663 A | * | 4/1978 | Montalvo ...................... 418/183 |
| 4,295,964 A | | 10/1981 | Preisler | |
| 4,562,895 A | * | 1/1986 | Kirchweger ................. 180/68.1 |
| 4,610,326 A | * | 9/1986 | Kirchweger et al. ........ 180/68.1 |
| 4,662,470 A | | 5/1987 | Fujisawa et al. | |
| 4,770,262 A | * | 9/1988 | Yasunaga et al. ............ 180/68.1 |
| 4,802,826 A | * | 2/1989 | Hall .............................. 417/243 |
| 5,244,036 A | * | 9/1993 | Michl ........................... 165/300 |
| 5,421,297 A | * | 6/1995 | Tamba et al. ............... 123/193.5 |
| 5,689,953 A | * | 11/1997 | Yamashita et al. .............. 60/316 |
| 5,901,808 A | | 5/1999 | Swenson et al. | |
| 5,908,013 A | * | 6/1999 | Dyess ...................... 123/65 BA |
| 6,220,207 B1 | * | 4/2001 | Kawasaki et al. .......... 123/41.11 |
| 6,612,270 B2 | * | 9/2003 | Fegg et al. .................. 123/41.44 |
| 6,871,628 B1 | | 3/2005 | Tauer | |
| 6,883,469 B2 | * | 4/2005 | Lu ............................... 123/41.01 |
| 6,955,150 B2 | * | 10/2005 | Moss ...................... 123/196 AB |
| 6,994,150 B1 | | 2/2006 | Kline | |
| 2002/0005191 A1 | * | 1/2002 | Maeda et al. ................. 123/572 |
| 2004/0244761 A1 | * | 12/2004 | Takeuchi .................. 123/196 R |

* cited by examiner

*Primary Examiner* — Noah Kamen
*Assistant Examiner* — Long T Tran
(74) *Attorney, Agent, or Firm* — Muncy, Geissler, Olds & Lowe, PLLC

(57) ABSTRACT

A fluid cooler for a fluid, such as oil, associated with an engine of a motorcycle or other vehicle, includes a housing, which may be tubular. In one embodiment, the housing includes a first vent for air intake located in a first end cap of the housing, and a second vent for air exhaust located in a second end cap. The second vent may have a cross sectional area approximately equal to a cross sectional area of the first vent. Within the housing, a fluid passageway contains a flow path of the fluid associated with the engine. A fan moves air past the fluid passageway. By the design of the cooler and its mounting orientation on the vehicle, in a preferred embodiment, substantially no air passes by the fluid passageway when the fan is not operating regardless of whether the vehicle is moving.

20 Claims, 13 Drawing Sheets

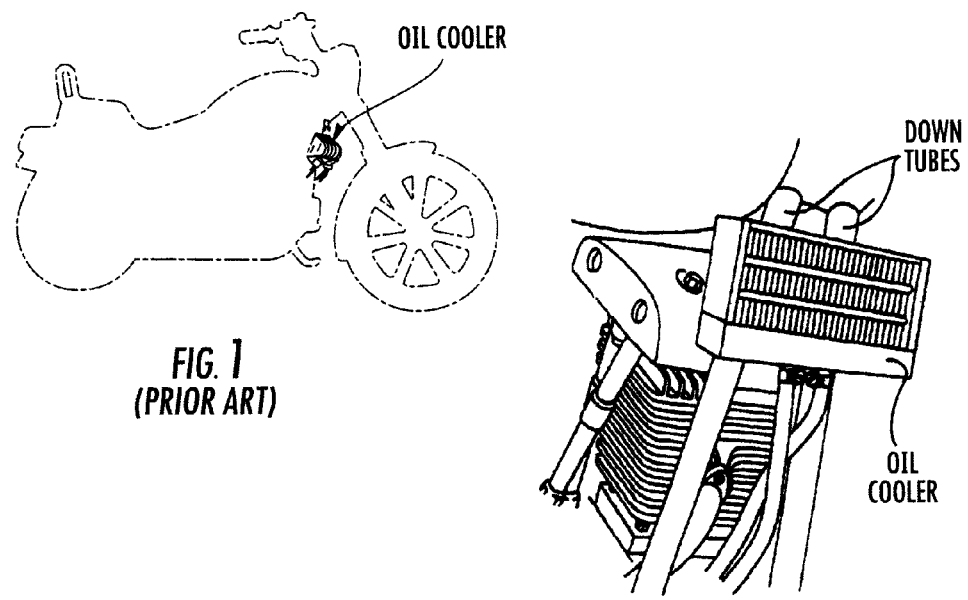
FIG. 1
(PRIOR ART)
FIG. 2
(PRIOR ART)
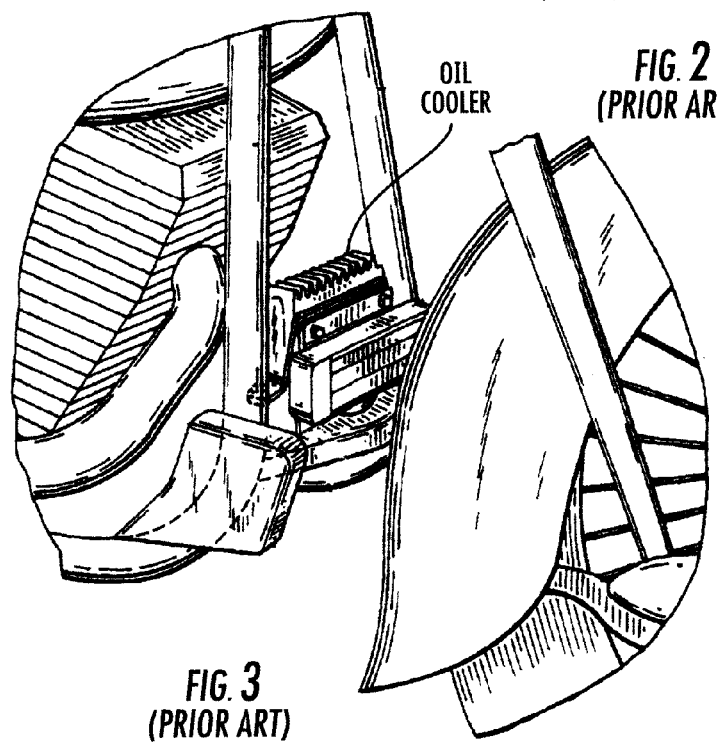
FIG. 3
(PRIOR ART)

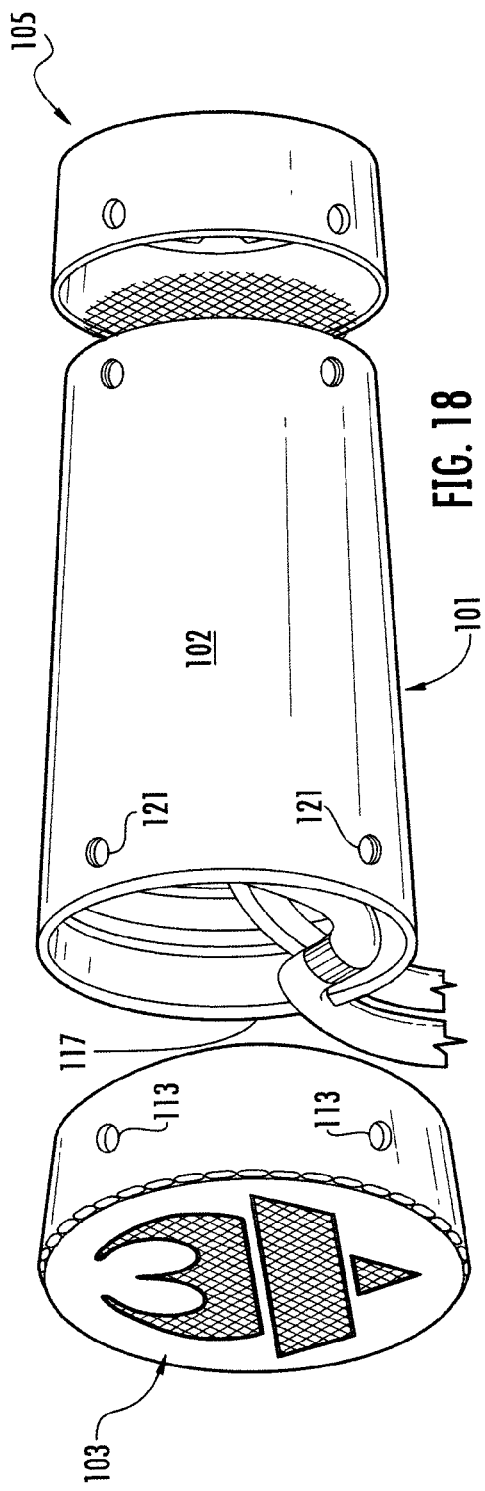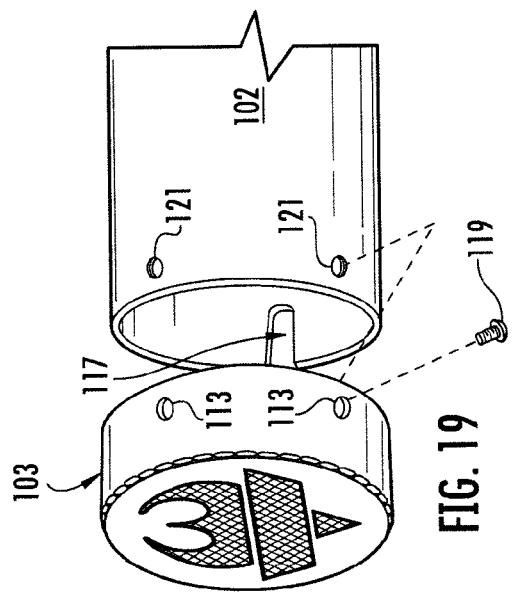

ENGINE FLUID COOLER

This application claims the benefit of U.S. Provisional Application No. 60/992,240, filed Dec. 4, 2007, the entire contents of which are herein incorporated by reference.

BACKGROUND OF THE INVENTION

1. Field of the Invention

The present invention relates to an engine fluid cooler. More particularly, the present invention relates to a fluid cooler, such as an oil cooler, for an internal combustion engine, such as a motorcycle's engine.

2. Description of the Related Art

An air-cooled engine of a motorcycle typically has a separate oil cooler. Oil is pumped through the oil cooler, where it is cooled and then passes back to the engine. The most common form of a motorcycle oil cooler is a rectangular structure mounted to front frame members of the motorcycle. FIGS. 1-4 illustrate typical prior art oil cooler structures and their placement on a motorcycle frame. For more detail about the function and structure of a motorcycle oil cooler, reference can be had to one or more of U.S. Pat. Nos. 4,295,964; 4,662,470; 5,244,036 and 5,901,808, each of which is herein incorporated by reference.

Having an oil cooler placed on the front frame of the motorcycle is particularly advantageous in that the oil cooler resides in an air stream created by movement of the motorcycle as it travels along a road. Thus, the oil cooler can receive a cooling air flow which is used to reduce the temperature of oil passing through the oil cooler. Hence, the efficiency of the oil cooler is improved by this frontal, mostly unobstructed placement on the motorcycle.

Drawbacks have been appreciated as to having the traditional oil cooler on the front of the motorcycle. One drawback is that the oil cooler is subject to damage from road debris (e.g. rocks, sand, bugs, trash) which can directly impact the cooling fins of the oil cooler from the roadway or get kicked up into the air by the front tire and impact the oil cooler. Such impacts can damage the oil cooler unit and lead to reduced cooling efficiency (e.g., a bent or clogged cooling fin) or engine overheating and damage (e.g., a broken or closed tube within the cooling unit).

Another appreciated drawback is that air flow through the oil cooler ceases when the motorcycle is stationary (e.g., stopped at a traffic light, stuck in traffic, slowly cruising along a beachfront street with a very slow speed limit like 5 mph). In fact, an oil cooler which produces a satisfactory drop of perhaps 20 degrees Fahrenheit in engine oil temperature when the motorcycle is traveling at road speeds, might produce an engine oil temperature drop of only 2 to 4 degrees Fahrenheit when the motorcycle is idling along in heavy traffic conditions. Such an oil temperature reduction is insufficient and can lead to engine overheating, damage and failure.

Another appreciated drawback is that the appearance of a custom motorcycle is very important to the purchaser/owner. An oil cooler typically has many complex surfaces (e.g. cooling fins or coils). Hence it is difficult to keep clean. Also because the oil cooler is very hot and sometimes splashed with water (e.g., rain), chroming on an oil cooler often becomes discolored with a blue or brown hue. Also, the oil lines to and from the oil cooler at the front of the motorcycle can be distracting to the overall appearance of the motorcycle and detract from the overall sleek appearance of the motorcycle.

Therefore, it has been desirable to hide the oil cooler on the motorcycle. One such approach to hide the oil cooler can be seen in U.S. Pat. No. 5,244,036. The solution of U.S. Pat. No. 5,244,036 is illustrated in FIG. 5, where the oil cooler is disguised as a more decorative front member, and might appeal to some riders as a spring-like structure. Further, the incoming and outgoing oil lines are moved to points very low on the motorcycle so as to not be distracting. However, the design of FIG. 5 still has drawbacks. The complex surfaces of the oil cooler are still visible and must be cleaned, the performance of the oil cooler still drops dramatically when the motorcycle stops moving, and some purchasers/owners may not desire this "springer" styling approach of hiding the oil cooler.

Another solution to hide the oil cooler can be seen in U.S. Pat. No. 6,871,628, which is herein incorporated by reference, and illustrated in FIGS. 6 and 7. In FIGS. 6 and 7, the oil cooler has been incorporated as a "snaked" pathway 60 formed within an outer cover plate 50 of an engine primary drive 14, which connects a V-twin engine 10 to a transmission 12.

Yet another solution to hide the oil cooler and to also place it in a position to receive a greater air flow can be seen in U.S. Pat. No. 6,994,150, which is herein incorporated by reference, and illustrated in FIGS. 8 and 9. In FIGS. 8 and 9, the fins 18 of the oil cooler have been integrated into the engine guard 20.

U.S. Pat. No. 6,955,150, which is herein incorporated by reference, shows a motorcycle oil cooling unit 1, as illustrated in FIGS. 10-13. The oil cooling unit 1 is mounted to down tubes 2 at the front frame of the motorcycle. An electrically operated fan 3 is controlled by an oil temperature thermostat and operates to provide a supplemental air flow to a radiator style oil cooler 4 when the oil temperature exceeds an upper threshold value.

The solution of U.S. Pat. No. 6,955,150 improves the cooling ability of the oil cooler while the motorcycle is stationary. However, the oil cooler is still distanced from the engine and attached to the front frame. Hence, extra components of the oil cooler are not well hidden or integrated on the motorcycle and electrical wires and oil lines to and from the oil cooler are also visible and distracting.

SUMMARY OF THE INVENTION

It is an object of this invention to address one or more of the drawbacks of the prior art engine fluid coolers and/or one or more of the Applicant's appreciated needs in the art.

The present invention provides a cooler for an engine fluid, such as an oil cooler for a motorcycle, with improved cooling abilities, as compared to the prior art oil coolers, and/or is more easily incorporated into the motorcycle's original aesthetics and compliments the motorcycle so as to not distract from the overall design of the motorcycle; and/or directs heated air from the oil cooler away from the engine/rider; and/or is completely or partially enclosed which protects the inner working components as well as making it immune to wind which creates a heating effect to the oil before a fan is activated to cool the oil. The oil cooler unit of the present invention was tested and found to heat the motorcycle's oil up to a normal operating temperature approximately as quickly as if the oil were not circulating through the oil cooler.

An additional and/or alternative advantage of the present invention is that the cooling ability of the oil cooler is not substantially influenced by a movement speed of the motorcycle. The oil cooler imparts a substantially consistent oil cooling effect on oil passing through the oil cooler, if the motorcycle is stationary and idling, versus traveling along a roadway at full speed.

An additional and/or alternative advantage of the present invention is that the oil cooler does not require a thermally activated diverter. With typical engines, oil flow is diverted past the oil cooler until the oil temperature reaches an optimum temperature, then a diverter valve is actuated to cause some or all of the oil flow to pass through the oil cooler. This process allows the oil to reach the optimum temperature more quickly, especially when the motorcycle is operating on a roadway and wind is passing over the cooling fins of the prior art oil cooler. By the present invention, oil may be continuously pumped through the oil cooling unit any time the motor is running, yet heat will not be substantially removed by the oil cooler until the optimum temperature is reached, even if the motorcycle is being operated along a roadway and wind is passing by the housing of the oil cooler of the present invention. By this advantage, the thermally activated diverter valve may be eliminated, which removes the possibility of a mechanical failure of the diverter valve and improves the reliability of the motorcycle.

One or more of these objects are accomplished by a fluid cooler for cooling a fluid, such as oil, associated with an engine of a vehicle, such as a motorcycle. The fluid cooler includes a housing for mounting to a portion of the vehicle. In one embodiment, the housing is tubular in shape. First and second vents for air flow are formed in the housing. In one embodiment, the first vent is for air intake and is located in a first end cap of the housing, while the second vent is for air exhaust, is located in a second end cap and has a cross sectional area approximately equal to a cross sectional area of the first vent. Within the housing, a fluid passageway exists for containing a flow path of the fluid associated with the engine. A fan moves air past the fluid passageway. By the design of the cooler and its mounting orientation on the vehicle, in a preferred embodiment, substantially no air passes through the housing when the fan is not operating regardless of whether the vehicle is moving.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 1 is a side view of a motorcycle with an oil cooler in accordance with a first embodiment of the prior art;

FIG. 2 is a front perspective view of an oil cooler in accordance with a second embodiment of the prior art;

FIG. 3 is a front perspective view of an oil cooler in accordance with a third embodiment of the prior art;

FIG. 18 is an exploded view of the oil cooler of FIG. 14;

FIG. 19 is a close-up exploded view of the assembly of the first end cap to a tube of the oil cooler;

DETAILED DESCRIPTION OF A PREFERRED EMBODIMENT

Figure 4:
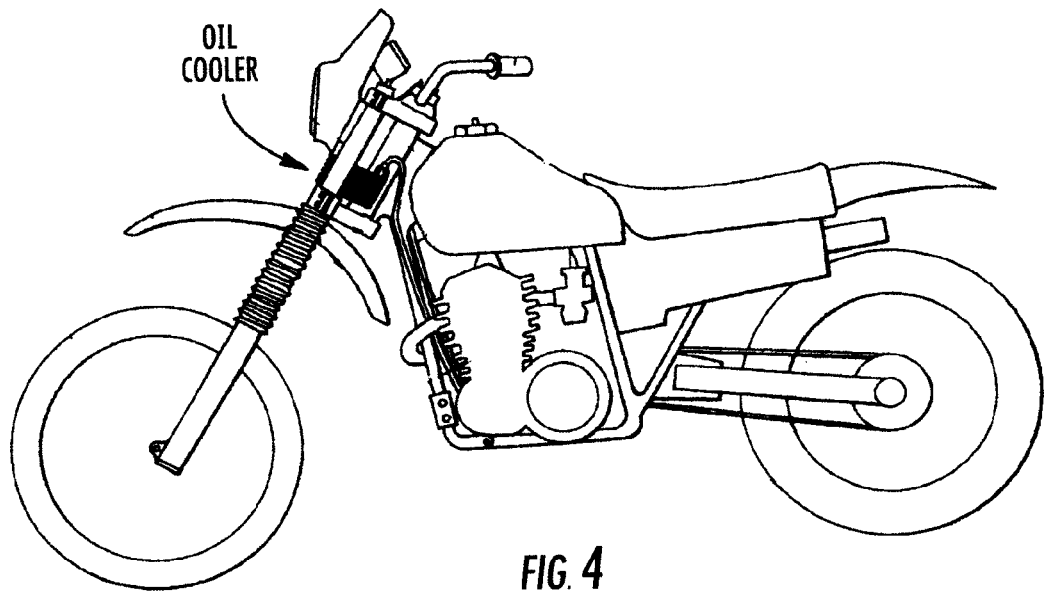
FIG. 4 is a side view of a motorcycle with an oil cooler in accordance with a fourth embodiment of the prior art.
Figure 5:
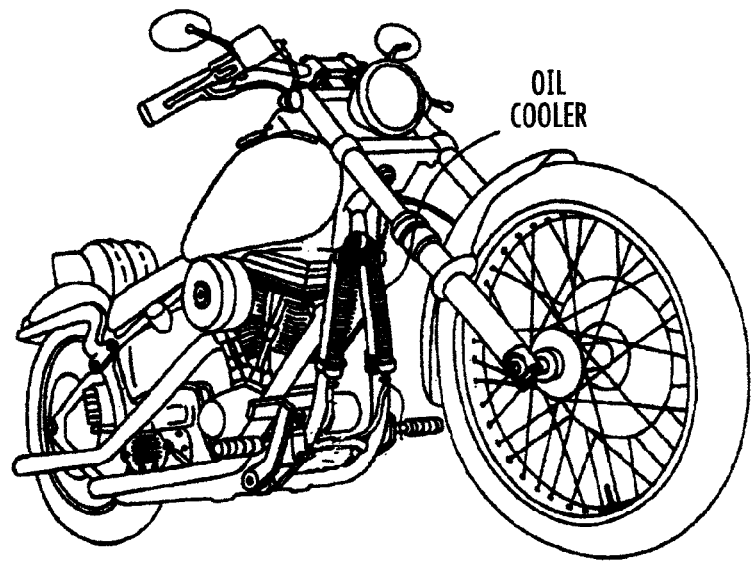
FIG. 5 is a front perspective view of a motorcycle with an oil cooler in accordance with a fifth embodiment of the prior art.
Figure 6:
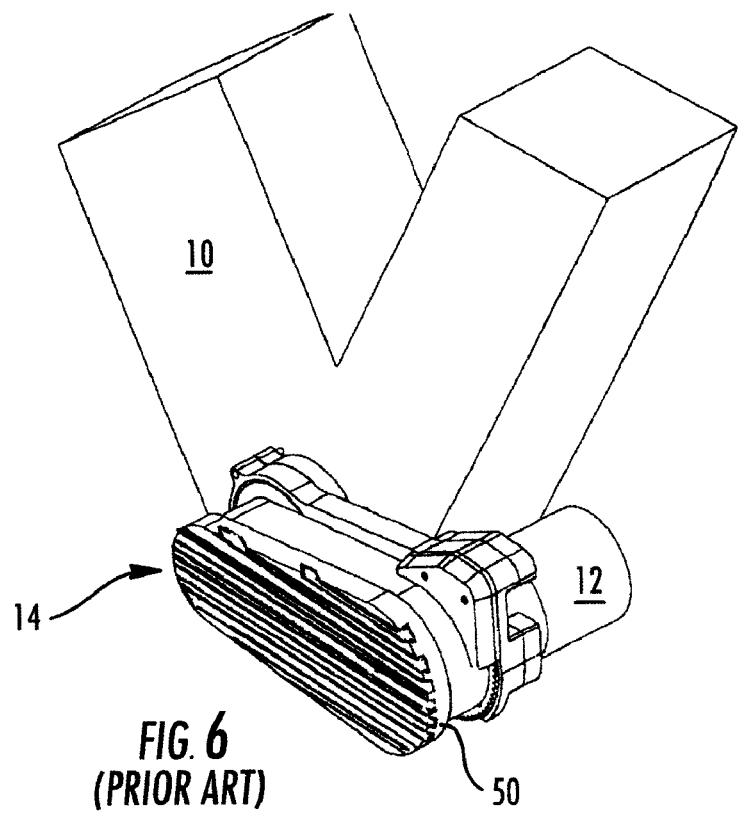
FIG. 6 is a front perspective view of a motorcycle engine incorporating an oil cooler in accordance with a sixth embodiment of the prior art.
Figure 7:
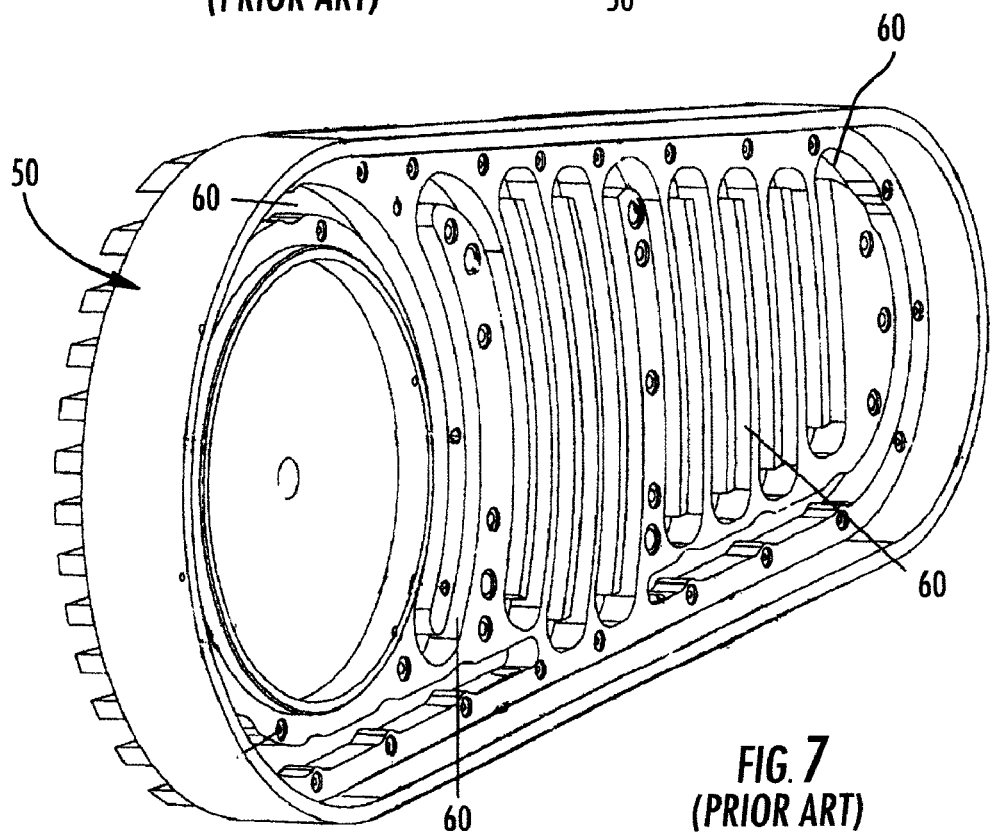
FIG. 7 is a backside view of a primary drive cover of the motorcycle engine of FIG. 6.
Figure 8:
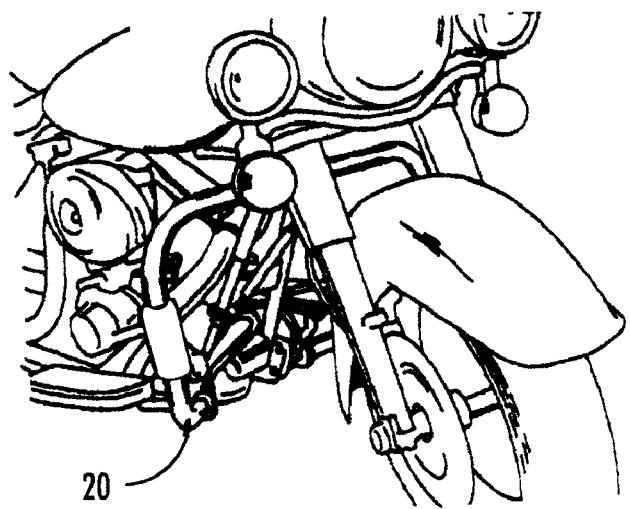
FIG. 8 is a front perspective view of a motorcycle with an oil cooler in accordance with a seventh embodiment of the prior art.
Figure 9:
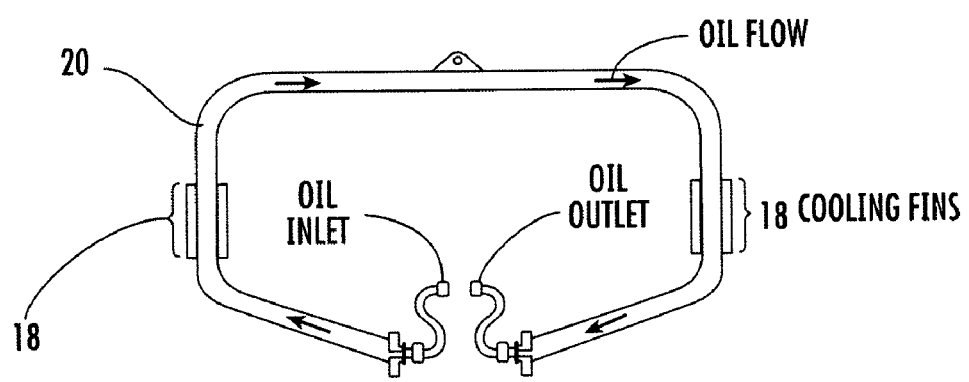
FIG. 9 is a front view of the engine guard in FIG. 8, which includes the oil cooler.
Figure 11:
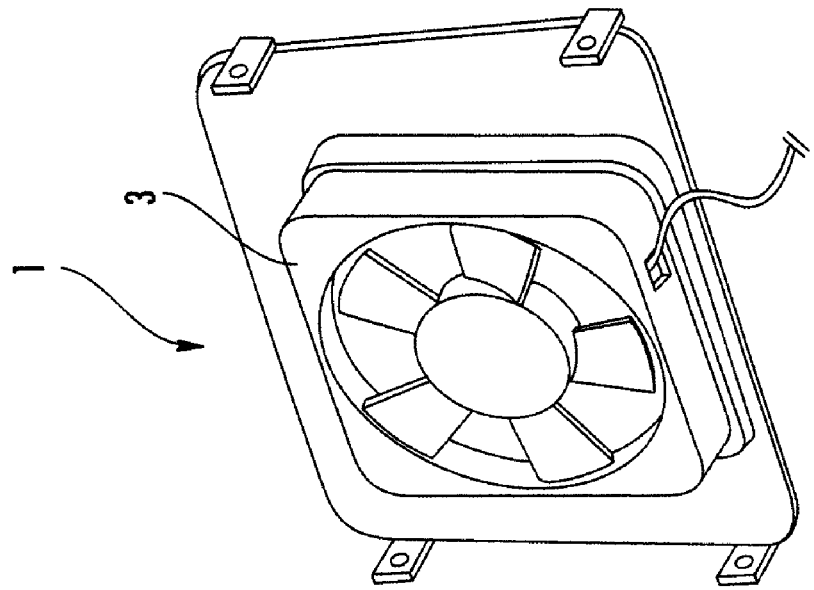
FIG. 11 is a front perspective view of the oil cooler of FIG. 10.
Figure 10:
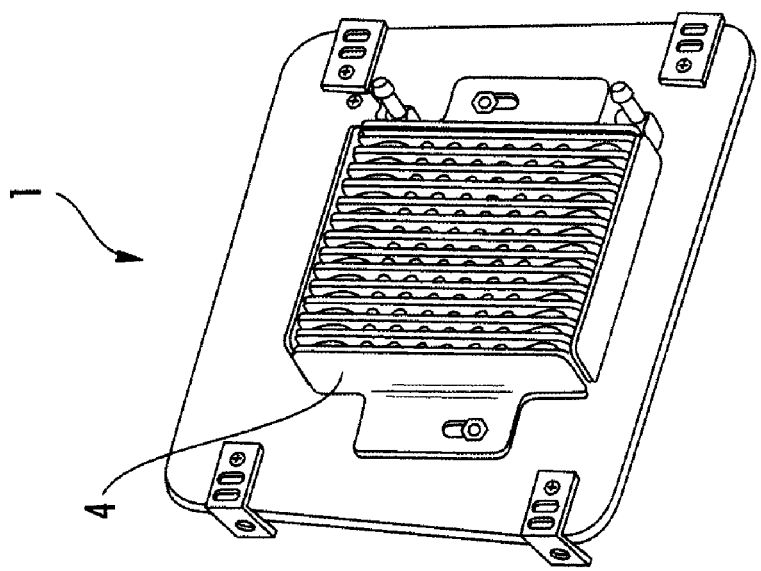
FIG. 10 is a back perspective view of a fan assisted oil cooler in accordance with an eighth embodiment of the prior art.
Figure 12:
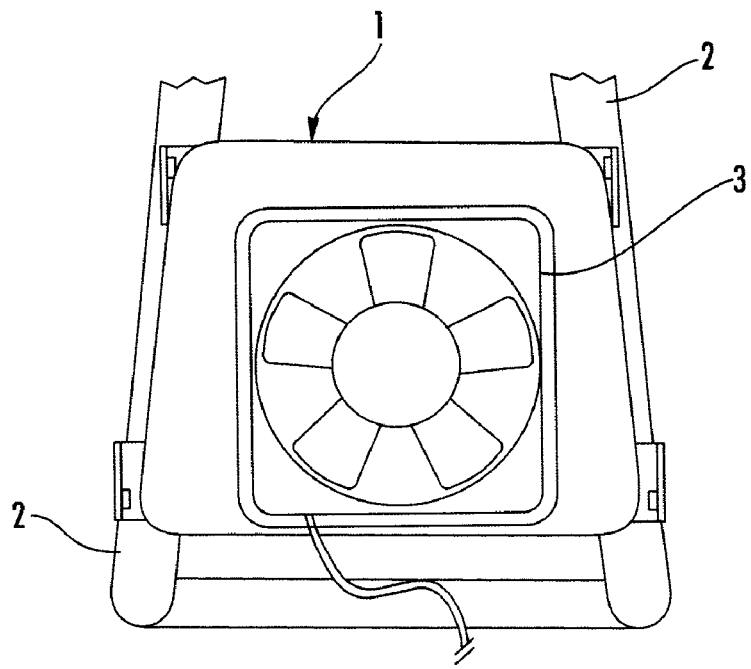
FIG. 12 is a front view of the oil cooler of FIGS. 10-11 mounted to down tubes of a motorcycle.
Figure 13:
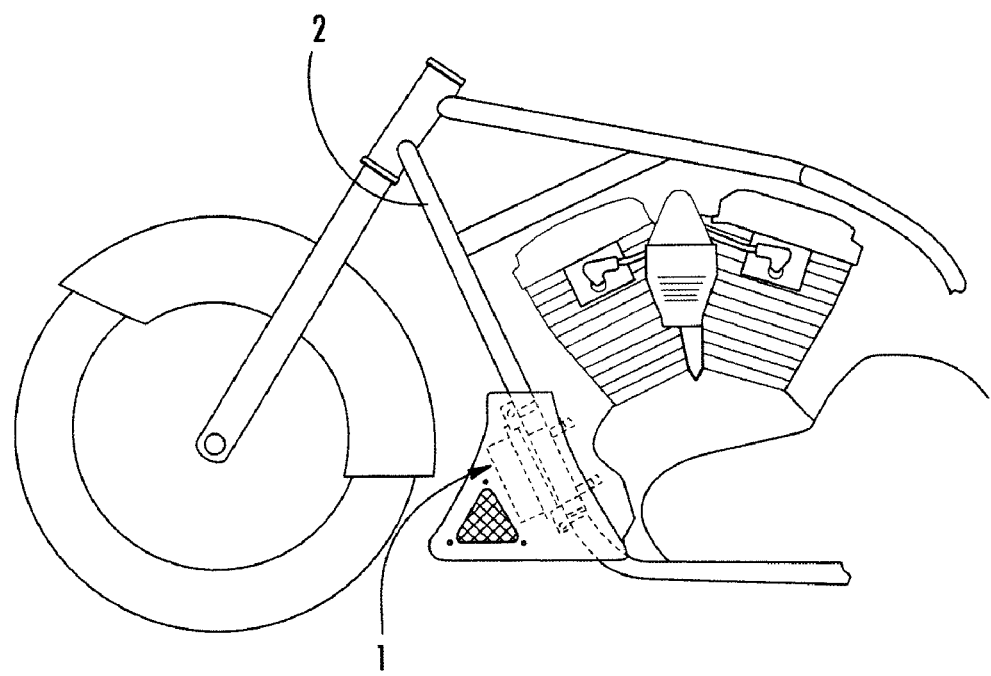
FIG. 13 is a side view of a motorcycle having the oil cooler of FIGS. 10-12.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

The present invention relates to an oil cooling system, and preferably a continuous airflow oil cooling system (CA-OCS™), through which oil is constantly passing when a motorcycle's engine is running and through which the engine oil is being cooled whenever it exceeds a predetermined threshold temperature. In the preferred embodiment, the oil cooling system includes a fan which may be thermostatically controlled to operate only when needed. The oil cooling system of the present invention will cool a motorcycle's engine oil just as well when the motorcycle's engine is running and the motorcycle is sitting still, as it does when the motorcycle is in motion. Further, the oil cooling system of the present invention is virtually invisible to an observer of the motorcycle, as it is incorporated into a custom housing, matching the color scheme and design lines of the motorcycle, which housing is mounted to a frame member near the bottom of the motorcycle.

Figure 14:
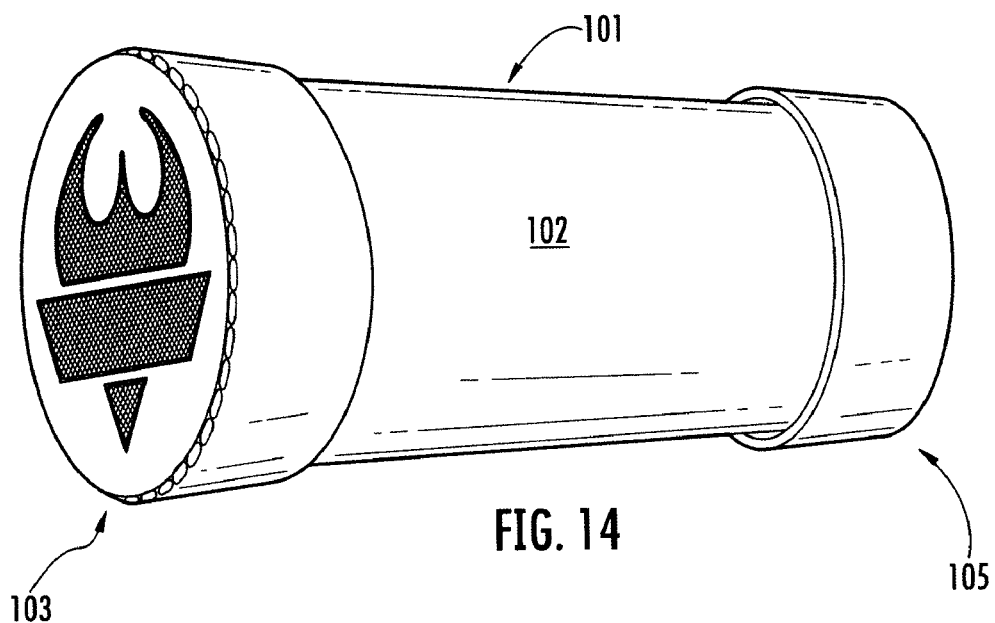
FIG. 14 is a perspective view of a motorcycle oil cooler, in accordance with the present invention.
Figure 15:
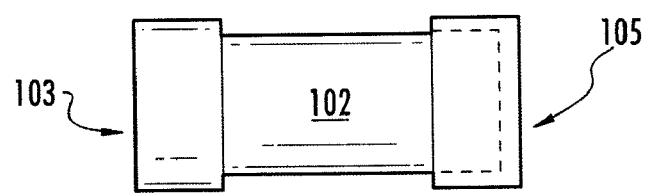
FIG. 15 is a side view of the oil cooler of FIG. 14.
Figure 16:
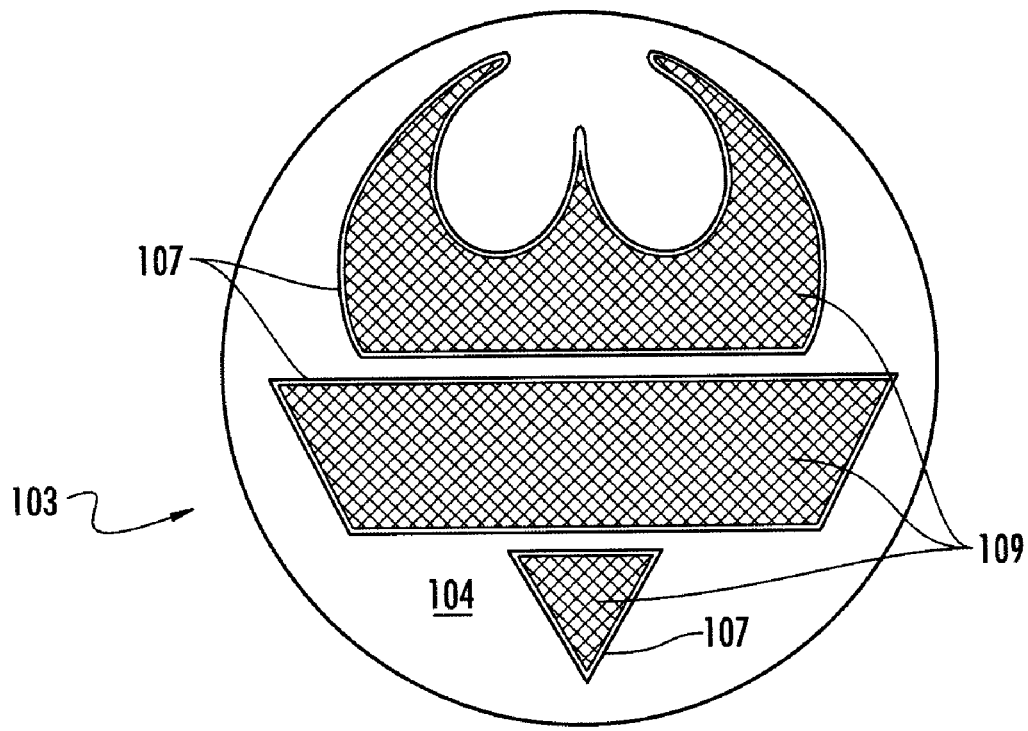
FIG. 16 is an end view of a first end cap of the oil cooler of FIG. 14.

As illustrated in FIGS. 14 and 15, the oil cooler of the present invention may take the form of a generally cylindrical housing 101 having a first end cap 103 and a second end cap 105. The housing 101 includes a tube 102 formed of aluminum, stainless steel or a similar metal, or even a thermal plastic, ceramic or composite material. In one embodiment, the tube 102 is approximately eight inches long. However, the tube 102 could have other lengths such as in the range of about six inches to about fourteen inches in length. In one embodiment, the overall housing 101 is approximately ten inches long. However, the overall housing 101 could have other lengths such as in the range of about eight inches to about sixteen inches in length FIG. 16 is planar view of the first end cap 103. The first end cap 103 may also be formed of a same or similar material as used to form the tube 102. As seen in FIG. 16, the end cap 103 includes through cut vent(s) 107 in its flat wall 104. A screen 109 may reside behind the through cut vent(s) 107. The screen 109 (e.g. an aluminum or stainless steel screen) may be formed of a same or similar material as used to form the tube 102 and the first end cap 103. The through cut vent(s) 107 may be oriented and sized to represent a trademark of the manufacturer or be any decorative design desired by the end user.

Figure 17:
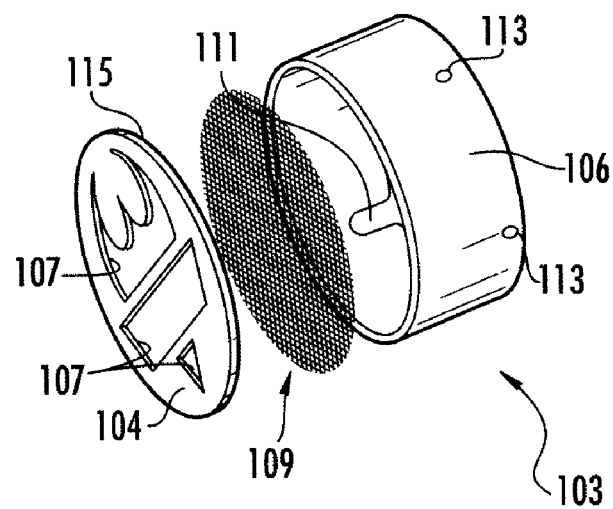
FIG. 17 is an exploded view illustrating an assembly of the first end cap of FIG. 16.

As best seen in FIG. 17, a cylindrical wall 106 of the end cap 103 includes a first slot 111 for accommodating an oil hose, as will be more fully explained later, and a plurality of through holes 113. The cylindrical wall 106 is approximately two and quarter inches in length, however other lengths, such as in the range of about one inch to about three inches are within the purview of the present invention. The flat wall 104 may be attached to the cylindrical wall 106 by spot welds, crimping, adhesive of other manners around its rim 115. Alternatively, the flat wall 104 and cylindrical wall 106 may be integrally formed. In one embodiment, the first end cap 103 is approximately four inches in diameter. However, the diameter of the first end cap 103 could have other dimensions such as in the range of about three inches to about six inches in diameter.

Figure 20:
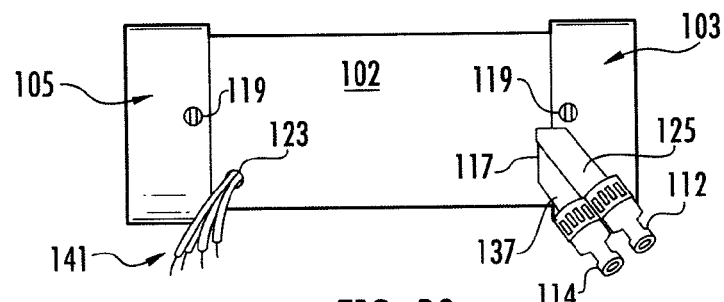
FIG. 20 is a back view of the oil cooler of FIG. 15.

As best seen in FIGS. 18 and 19, the end of the tube 102 has a second slot 117. When the first end cap 103 is secured to the tube 102, the first slot 111 is aligned with the second slot 117. Further, a plurality of screws 119 (see FIG. 19) may be passed through the plurality of holes 113 to engage within threaded portions 121 of the tube 102. The threaded portions 121 may be formed within the tube 102 or may protrude from the tube 102. As seen in FIGS. 18 and 20, the first and second slots 111 and 117 allow for the passage of oil hoses including an input oil line 125 and an output oil line 137. To make the oil cooler easy to install and remove from a motorcycle, the input and output oil lines 125 and 137 may be quickly terminated to respective connection nipples 112 and 114 by clamps.

The second end cap 105 may be constructed in a similar or identical fashion to the first end cap 103. For example, the second end cap 105 may include a flat wall, cylindrical wall, through cut vent(s), screen, etc. The second end cap 105 may also include a through slot like the through slot 111 in the first end cap 103; however the through slot in the second end cap 105 may be used for the passage of electrical wires rather than oil lines. Alternatively, as illustrated in FIG. 20, a hole 123 may be provided in the tube 102 to accommodate an electrical wiring harness 141 (for a thermal switch and a fan, as will be more fully explained hereinafter), in which case the second end cap 105 need not include a through slot and the second end of the tube 102 receiving the second end cap 105 need not include a mating slot.

Figure 21:
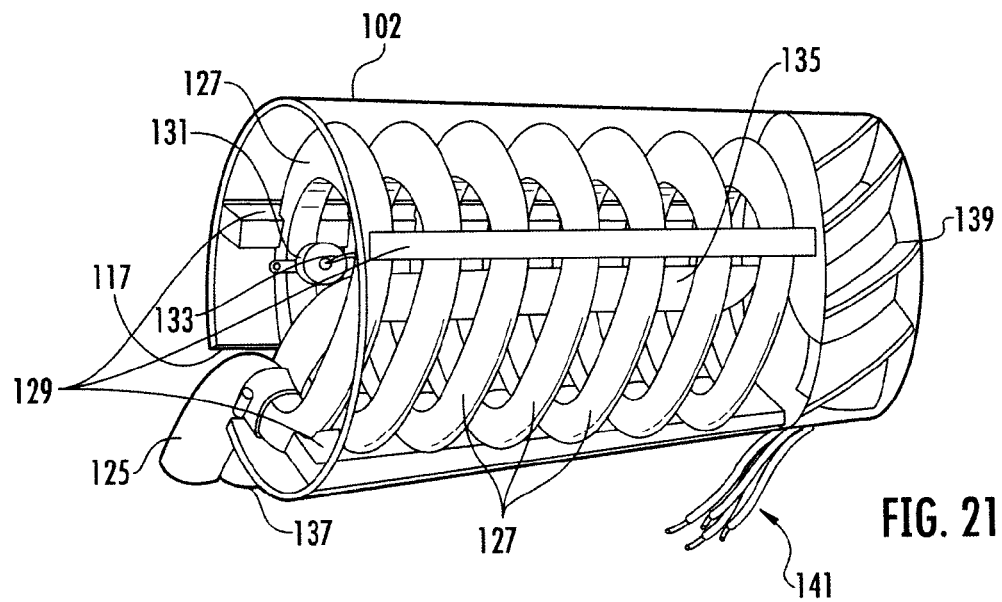
FIG. 21 is a front perspective view of the tube of the oil cooler of FIG. 14 with the tube in transparency to illustrate the internal parts.

Now, with reference to FIG. 21, the internal components of the oil cooler will be described. The input oil line 125, which supplies hot oil from the engine to the oil cooler, is connected to a coiled tube 127 within the tube 102. The coiled tube 127 may be formed of copper or a similar metal with good heat conducting properties to function as a heat exchanger. The coiled tubing 127 is relative long, such as in the range of about fifty to seventy five inches in length, or more preferably about sixty four inches in length. The coiled tube 127 is supported by a plurality (e.g., three) of isolators 129 formed of rubber, ceramic or a similar material.

As oil from the motor enters the oil cooler, its temperature is monitored by a thermal sensor. The thermal sensor may output an electrical signal dependent upon the temperature of the oil in the coiled tube 127. The thermal sensor may take the form of a thermal switch 131 and provide an electrical signal when the oil temperature exceeds a predetermined threshold value (e.g., one hundred eighty degrees Fahrenheit). The thermal switch 131 is conventional in design, and therefore its internal structure will not be further described. An electrical continuity, representing the temperature of the oil passing through the coiled tube 127, is rendered by the thermal switch 131 to other circuitry via wires 133 which are part of the wiring harness 141 exiting the housing 101 via the hole 123. The circuitry will be described in more detailed with reference to FIG. 24.

After the engine oil passes through the coiled tube 127, it passes into an insulated oil return tube 135. The insulated oil return tube 135 exits the oil cooler as the output oil line 137. The output oil line 137 returns cooled oil to the engine, e.g., an engine oil reservoir.

A powered fan 139 (e.g., electrically powered from the motorcycle's battery) is mounted within the housing 101. In a preferred embodiment, the powered fan 139 is high performance with a rating in the range of about forty cubic feet per minute (cfm) to about one hundred ten cfm, such as about sixty five to about one hundred cfm. One embodiment of the fan 139 draws about 1.1 amps while moving about ninety seven cfm of air. The powered fan 139 is activated by circuitry, which will be described hereinafter with reference to FIG. 24. The powered fan 139 has the ability to push or pull air through the housing 101. In one embodiment, the powered fan 139 pulls air into the housing 101 through the vents of the second end cap 105, and pushes that air past the coiled tube 127 and out the vents 107 of the first end cap 103. Electrical leads of the powered fan 139 and thermal switch 131 are collectively referred to as the wiring harness and represented by reference numeral 141 in FIGS. 20 and 21. The wiring harness 141 may exit the housing 101 via the hole 123 in the tube 102 (See FIG. 20).

Figure 22:
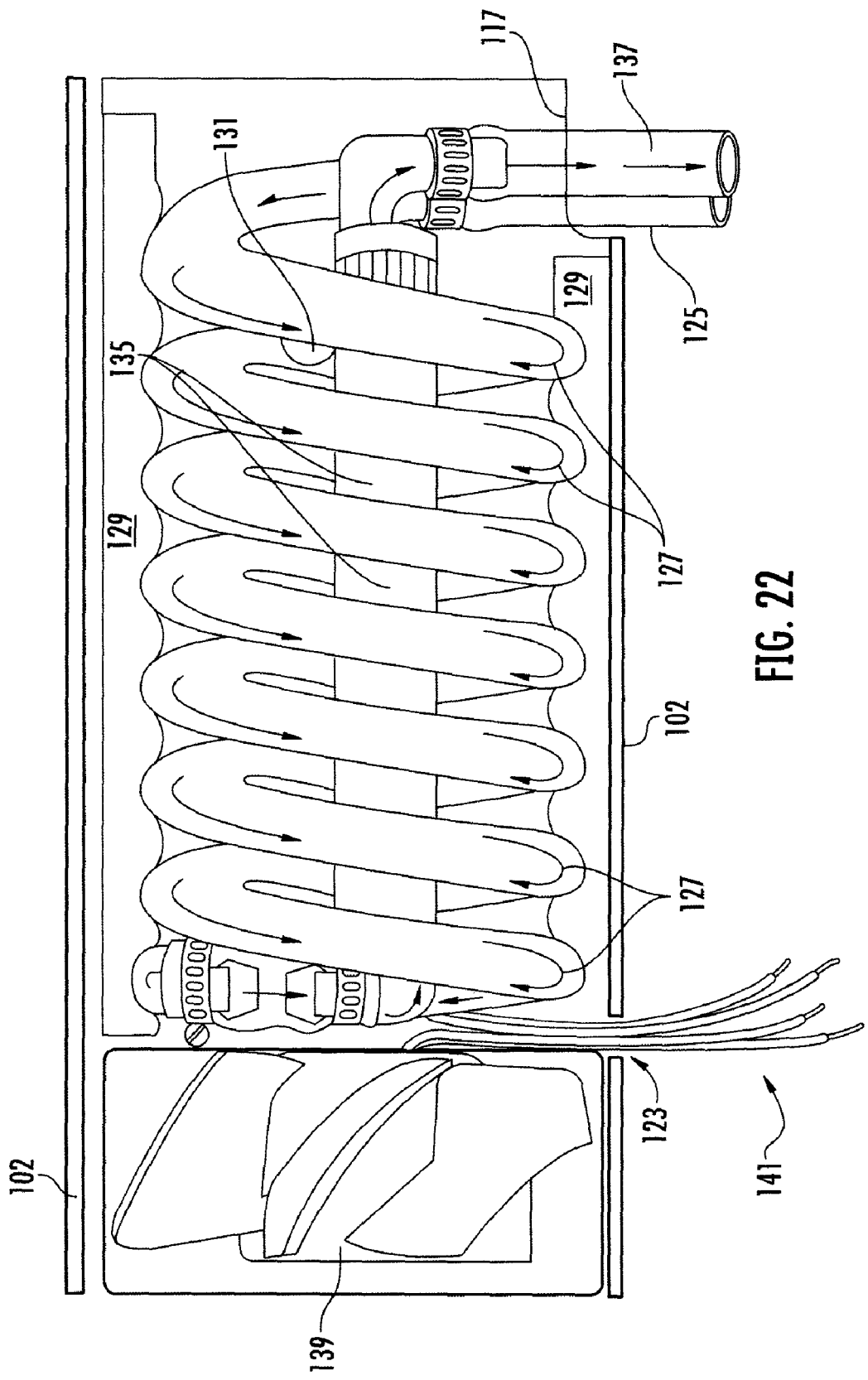
FIG. 22 is a back view of the tube of the oil cooler with the tube in transparency to illustrate an oil flow pathway.

FIG. 22 illustrates the oil flow within the oil cooler. Oil entering the oil cooler via the input oil line 125 passes through the coiled tube 127 in the direction of the depicted arrows. After passing through the coiled tube 127, the oil enters the insulated oil return tube 135 and exits the oil cooler via the output oil line 137. In other words, as hot oil travels in the coiled tube 127 toward the cold air being drawn in by the fan 139, the oil is cooled and then returns via the insulated oil return tube 135.

Figure 23:
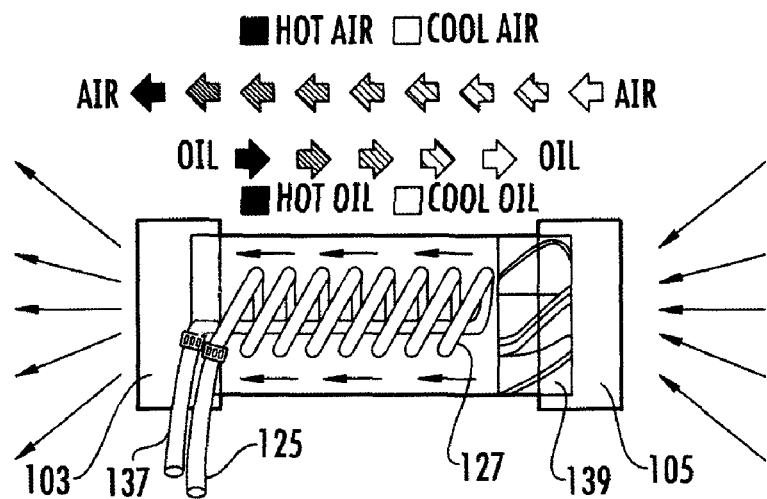
FIG. 23 is a diagram illustrating the heat transitions of oil and air within the oil cooler.

FIG. 23 graphically illustrates the cooling ability of the oil cooler. As ambient air is drawn into the housing 101 by the powered fan 139 via the second end cap 105, the air is gradually heated. The heated air is exhausted via the first end cap 103. Engine oil is pumped into the coiled tube 127 via the input oil line 125 proximate the first end cap 103. The oil is gradually cooled as it travels through the coiled tube 127. The cooled oil exits the housing 101 via the output oil line 137 also proximate the first end cap 103. Of course, the powered fan 139 may be designed to move air in the opposite direction through the housing 101, in which case the oil and air temperature variations depicted in FIG. 23 would be reversed.

Figure 24:
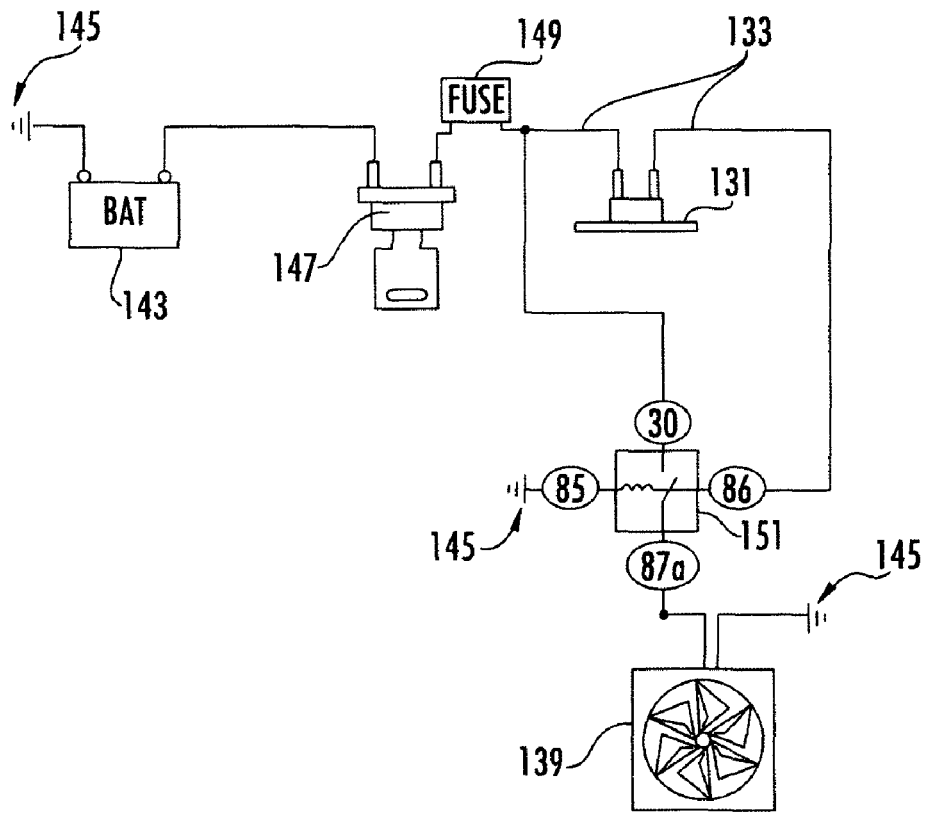
FIG. 24 is an electrical schematic of the circuitry associated with the oil cooler.

FIG. 24 illustrates one embodiment of circuitry to control the oil cooling system. A motorcycle battery 143 serves to power the electrical component parts of the oil cooler. The negative pole of the battery 143 is connected to a common ground 145 (e.g. the motorcycle frame). The positive pole of the battery 143 is connected to the motorcycle's ignition switch 147. When the ignition switch 147 is turned on, power from the battery 143 passes through a fuse 149 to the thermal switch 131 and to a relay 151 (such as a relay rated for a thirty amp current).

In the embodiment of FIG. 24, the relay 151 is of the "normally open" type, such that power does not transmit across terminal (30) to terminal (87a) unless a voltage is presented at terminal (86). By this arrangement, power does not pass through the terminals (30) and (87a) until the thermal switch 131 senses a temperature above the predetermined threshold value (e.g., 180 degrees Fahrenheit).

Once the oil temperature in the coiled tube 127 reaches the predetermined threshold value, the thermal switch 131 allows a voltage to pass therethrough and reach the terminal (86). At that point, the voltage of the battery 143 is supplied to the powered fan 139 to activate the cooling process in the oil cooler.

Figure 25:
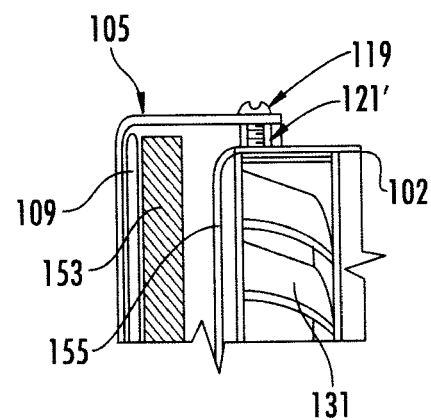
FIG. 25 is a close-up cross sectional view of an alternative embodiment of the mounting between the second end cap and the tube.

FIG. 25 illustrates an alternative embodiment of the present invention. In the alternative embodiment, a filter media 153 (e.g. a fiberglass sheet) is disposed downstream of the screen 109 and upstream of the powered fan 139 to capture dust and debris prior to its entrance into the powered fan 139 and the coiled tube 127. A separation bracket 155 may also be provided upstream of the powered fan 139 and downstream of the filter media 153 to ensure that the filter media 153 does not interfere with the powered fan 139.

FIG. 25 also illustrates that the threaded portions 121 may be formed as protruding elements 121' attached to the tube 102, so that an air gap exists between the end caps 103/105 and the tube 102 to help accelerate airflow, but this is an optional design feature not required by the present invention, as a gap need not exist between the end caps 103/105 and the tube 102.

Figure 26:
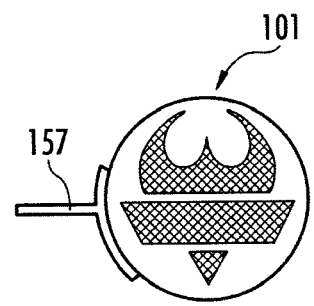
FIG. 26 is a side view of the oil cooler and an attachment bracket.
Figure 27:
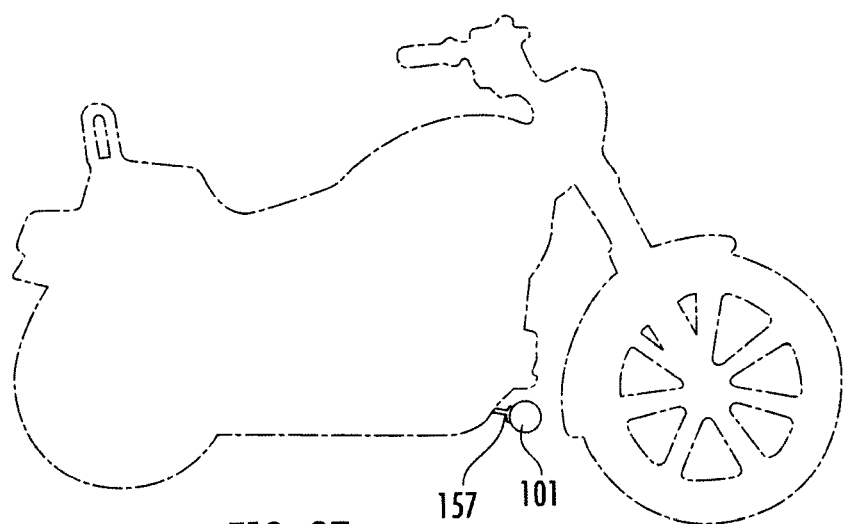
FIG. 27 is a side view showing a preferred mounting position of the oil cooler on a motorcycle.

FIG. 26 shows a mounting bracket 157 attached to the housing 101. The mounting bracket 157 may be attached to the housing 101 by a weld, clamp, adhesive, etc. As best seen in FIG. 27, the mounting bracket 157 allows the housing 101 of the oil cooler to be attached to a frame member or other hardware of a motorcycle.

In accordance with the present invention and as illustrated in FIG. 27, the housing 101 is mounted in a transverse manner to the motorcycle. In other words, the end caps 103 and 105 face to opposite lateral sides of the motorcycle, with respect to the normal travel direction of the motorcycle. Although FIG. 27 shows the oil cooler as being mounted in a transverse manner to a front of a motorcycle frame, the oil cooler could be mounted transversely to a rear of the motorcycle frame or to other portions or components of the motorcycle. This transverse mounting arrangement provides several advantages.

A primary advantage is that air will not tend to flow through the housing 101 even if the motorcycle is in motion and traveling at speed along a roadway. The two air vents of the oil cooler of the present invention do not face to, or away from, the travel direction of the motorcycle (they actually face perpendicular to the travel direction), as shown in FIG. 27. Also, the surface area of the vent in the first end cap 103 is substantially equal to the surface area of the vent in the second end cap 105. Therefore, air will not be naturally pushed through the oil cooler as a result of motorcycle movement, or naturally drawn through the oil cooler as a result of a vacuum force created by motorcycle movement.

Therefore, when the motorcycle is initially started, oil may be pumped through the oil cooler and the motorcycle may be made to travel without having the oil cooler operating to reduce the oil temperature to any great extent. This is a primary advantage. In the oil coolers of the prior art, a thermally actuated diverted valve was used to divert oil flow away from the oil cooler until the oil reached a predetermined operating temperature. By that arrangement, the oil was more quickly heated by the motorcycle to its optimum temperature. However, in the present invention, the thermally actuated valve may be eliminated and the oil may be continuously circulated through the oil cooler without any substantial increase in the amount of time needed to heat the oil to its optimum operation temperature. In other words, the housing 101 holds heat until the thermal switch 131 is actuated to cause the powered fan 139 to operate.

Another advantage resides in the length of the coiled tubing 127 which is exposed to the air flow stream. In a relatively small housing 101, oil is exposed to more cooling air flow, as compared to the oil cooler designs of the prior art. Further, the coiled tubing 127 is not exposed to view, such that the coiled tubing itself will not detract from the appearance of the motorcycle or require detailed cleaning.

Yet another advantage of the present invention resides in the fact that heated air exiting the oil cooler is directed away from the motorcycle and rider. In the prior art oil coolers, the heated air was directed rearwardly toward the engine and rider's legs. The prior art designs unfortunately transferred some the heat dissipation from the oil cooler directly back to the engine and also contributed to the heat radiating from the engine to the rider's legs, which could be uncomfortable to the rider. These drawbacks are alleviated by the present invention wherein a fan forcefully directs the heated air away from the motorcycle and the rider, e.g., in a direction perpendicular to the travel direction of the motorcycle.

Although the above embodiment has been described and illustrated as an original equipment device to be installed on a motorcycle as initially built, it is to be understood that the parts described could be packaged as a retro fit kit. In other words, an existing oil cooler (e.g. FIGS. 1-13) could be removed from the motorcycle and the oil lines leading to the removed oil cooler could be attached to the oil cooler of the present invention. Also, the oil cooler of the present invention can be installed onto motorcycles that were not previously equipped with any form of oil cooler.

The oil cooling system of the present invention will provide optimum engine cooling even when the motorcycle is stationary due to the powered fan and enhanced surface area of the oil carrying tubes which are exposed to a moving air flow.

Although the present invention has been described as being used in combination with an engine of a motorcycle, it is to be understood that the cooler of the present invention could be used in combination with engines for other vehicles, such as an all-terrain vehicle (ATV), a snowmobile, a golf cart, a go-cart, a tractor or a lawn mower. Further, the present invention has been described in conjunction with cooling the oil of an engine, if the engine is equipped with a water-cooled block, the present invention could be used to cool the water/antifreeze mixture used to cool the engine and hence serve as a replacement or supplement for a conventional radiator.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. A vehicle comprising:
   an engine for imparting movement to said vehicle;
   a cooler connected to said engine for cooling a fluid associated with said engine of said vehicle, wherein said cooler includes:
   a housing mounted to a portion of said vehicle;
   a first vent for air intake formed in said housing;
   a second vent for air exhaust formed in said housing;
   an air passageway passing through said housing from said first vent to said second vent;
   a fluid passageway existing within said air passageway of said housing, said fluid passageway containing a flow path of said fluid associated with said engine of said vehicle separate from air in said air passageway; and
   a fan for moving air through said first vent, through said air passageway and past said fluid passageway and out said second vent, wherein substantially no air passes through said air passageway of said housing when said fan is not operating regardless of whether said vehicle is moving.

2. The vehicle of claim 1, wherein a substantially same volume of air per unit time passes through said air passageway of said housing when said fan is operating regardless of a speed of said vehicle while moving.

3. The vehicle of claim 1, wherein said vehicle is a motorcycle and wherein said fluid is oil.

4. A fluid cooler for cooling a fluid associated with an engine of a vehicle, said cooler comprising:
   a housing for mounting to a portion of the vehicle;
   a first vent for air intake formed in said housing;
   a second vent for air exhaust formed in said housing;
   an air passageway passing through said housing from said first vent to said second vent;
   a fluid passageway existing within said air passageway of said housing, said fluid passageway for containing a flow path of the fluid associated with the engine of the vehicle separate from air in said air passageway; and
   a fan for moving air through said first vent, through said air passageway and past said fluid passageway and out said second vent, wherein substantially no air passes through said air passageway of said housing when said fan is not operating regardless of whether the vehicle is moving.

5. The fluid cooler of claim 4, wherein a cross sectional area of said first vent is approximately equal to a cross sectional area of said second vent.

6. The fluid cooler of claim 4, wherein said housing includes a tube with a generally cylindrical shape, a first end cap and a second end cap, and wherein said first vent is formed in said first end cap and said second vent is formed in said second end cap.

7. The fluid cooler of claim 4, wherein said fluid passageway is formed by a coil of tubing placed inside said housing.

8. The fluid cooler of claim 7, further comprising:
   at least one thermal isolator supporting said coil of tubing inside said housing and away from walls forming said housing.

9. The fluid cooler of claim 4, further comprising:
   a thermal switch for measuring an engine fluid temperature, wherein said fan is activated to move air through said air passageway of said housing when the engine fluid temperature exceeds a predetermined threshold value.

10. The fluid cooler of claim 4, wherein a substantially same volume of air per unit time passes through said air passageway of said housing when said fan is operating regardless of a speed of the vehicle while moving.

11. A motorcycle comprising:
a frame;
at least two wheels attached to said frame;
an internal combustion engine attached to said frame; and
an oil cooler attached to said frame, said oil cooler including:
a housing;
a first vent in said housing;
a second vent in said housing;
an air passageway passing through said housing from said first vent to said second vent;
an oil passageway existing within said air passageway of said housing, said oil passageway containing a flow path for oil associated with said internal combustion engine separate from air in said air passageway;
a fan for moving air through said first vent, through said air passageway and past said oil passageway and out said second vent; and
oil lines connecting said internal combustion engine to said oil passageway, wherein said first vent faces in a first direction substantially perpendicular to a normal travel direction of said motorcycle, such that said first vent faces substantially perpendicular to an air stream created by movement of said motorcycle in the normal travel direction.

12. The motorcycle of claim 11, wherein said second vent faces in a second direction substantially perpendicular to the normal travel direction of said motorcycle.

13. The motorcycle of claim 12, wherein said second direction is generally opposite to said first direction.

14. The motorcycle of claim 11, wherein engine oil is constantly pumped through said oil passageway whenever said internal combustion engine is in operation, regardless of an engine oil temperature.

15. The motorcycle of claim 11, wherein ambient air is drawn in through said first vent from an area to a side of said motorcycle and heated air is exhausted from said second vent to an area on an opposite side of said motorcycle.

16. The motorcycle of claim 11, wherein substantially no air passes through said air passageway of said housing when said fan is not operating regardless of whether said motorcycle is moving.

17. The motorcycle of claim 11, wherein a substantially same volume per unit time of air passes through said air passageway of said housing when said fan is operating regardless of a speed of said motorcycle while moving.

18. The motorcycle of claim 11, wherein a cross sectional area of said first vent is approximately equal to a cross sectional area of said second vent.

19. The motorcycle of claim 11, wherein said housing includes a tube with a generally cylindrical shape, a first end cap and a second end cap, and wherein said first vent is formed in said first end cap and said second vent is formed in said second end cap.

20. An oil cooler for an engine of a motorcycle, said cooler comprising:
a substantially tubular shaped housing for mounting to a portion of the motorcycle;
a first vent for air intake formed in a first end cap of said substantially tubular shaped housing;
a second vent for air exhaust formed in a second end cap of said substantially tubular shaped housing;
an air passageway passing through said housing from said first vent to said second vent;
a serpentine oil passageway existing within said housing, said oil passageway for containing a flow path of the oil associated with the engine of the motorcycle separate from air in said air passageway; and
a fan for moving air through said first vent, through said air passageway and past said oil passageway and out said second vent, wherein substantially no air passes through said air passageway of said housing when said fan is not operating regardless of whether the motorcycle is moving.

* * * * *